United States Patent [19]
Meerholz et al.

[11] Patent Number: 5,744,267
[45] Date of Patent: Apr. 28, 1998

[54] AZO-DYE-DOPED PHOTOREFRACTIVE POLYMER COMPOSITES FOR HOLOGRAPHIC TESTING AND IMAGE PROCESSING

[75] Inventors: Klaus Meerholz; Bernard Kippelen; Nasser N. Peyghambarian; Scott R. Lyon; Henry K. Hall, Jr.; Anne B. Padias; (NFN) Sandalphon; Boris L. Volodin, all of Tucson, Ariz.

[73] Assignee: Arizona Board of Regents acting for and on behalf of University of Arizona, Tucson, Ariz.

[21] Appl. No.: 710,084

[22] Filed: Sep. 10, 1996

Related U.S. Application Data

[63] Continuation of Ser. No. 321,737, Oct. 12, 1994, abandoned.

[51] Int. Cl.$^6$ .................... G03H 1/04; G03C 1/72
[52] U.S. Cl. .................... 430/1; 430/2; 430/290; 375/4; 359/4
[58] Field of Search .................... 430/1, 2, 290, 430/845; 385/4, 130–132, 122, 141; 359/1, 3, 4; 538/848, 845, 851

[56] References Cited

U.S. PATENT DOCUMENTS

| | | | |
|---|---|---|---|
| 4,395,350 | 7/1983 | Boller et al. | 534/843 |
| 4,999,809 | 3/1991 | Schildkraut et al. | 365/106 |
| 5,039,186 | 8/1991 | Man et al. | 385/141 |
| 5,064,264 | 11/1991 | Ducharme et al. | 385/130 |
| 5,115,336 | 5/1992 | Schildkraut et al. | 359/245 |
| 5,173,381 | 12/1992 | Natansohn et al. | 430/19 |
| 5,184,322 | 2/1993 | Schildkraut et al. | 365/124 |
| 5,361,148 | 11/1994 | Bjorklund et al. | 359/3 |

FOREIGN PATENT DOCUMENTS

| | | | |
|---|---|---|---|
| 0514786 | 11/1992 | European Pat. Off. | 359/3 |
| 50-158584 | 12/1975 | Japan | 534/843 |

OTHER PUBLICATIONS

Smith et al. JACS 63 (Apr. 1941) pp. 1036–1043.
Kippeln et al. "Photorefractive . . . ", (Sep. 1993) 74(5) pp. 3617–3619.
Solomons "Organic Chemistry" Third Ed. (1984) p. 485.
Grant and Hackh's Chemical Dictionary, (1987) p. 587.
Donkers et al., "Net Two Beam . . . " Opt. Lett. 18(13) pp. 1044–1046 (Jul. 1993).
Silence et al. "C60 sensitization . . . ", Appl. Phys. Lett., 61(25) pp. 2967–2969 (Dec. 1992).
Zhang et al. "Observation of Photorefractivity . . . " Phys Rev. B. (Oct. 1992) 9900–9902.
Silence et al. "$C_{60}$ Sensitization of a Photorefractive Polymer" Appl. Phys. leH. 2967–2969 (Dec. 1992).

(List continued on next page.)

*Primary Examiner*—Martin Angebranndt
*Attorney, Agent, or Firm*—Oblon, Spivak, McClelland, Maier & Neustadt, P.C.

[57] ABSTRACT

A photorefractive (PR) device comprises of a layer of a novel photorefractive polymer composite sandwiched inbetween two transparent electrodes. The PR polymer composite comprises a photoconducting polymer, a photosensitizer, a novel second-order, non-linear optical chromophore, and a plasticizer in an amount sufficient to provide the PR polymer composite with a glass transition temperature below about 45° C. The PR polymer composite is capable of internally storing image patterns generated by interfering two coherent light beams inside the material. The PR polymer composite shows high diffraction efficiencies (near 100%) and high net two-coupling gain (>200 cm$^{-1}$). The writing of information is reversible. Consequently, the device is suitable for read/write holographic storage and real-time image processing applications, and is capable of being poled at essentially room temperature. The light source is an integrated semiconductor laser and the detector is a commercial Si photodiode or a CCD camera.

50 Claims, 6 Drawing Sheets

OTHER PUBLICATIONS

A. Natansohn et al, "Azo Polymers for Reversible Optical Storage. 1. Poly [4'-[[2-(acryloxloxy)ethyl]ethylaminol]-4-nitroazobenzene]", Macromolecules 1992, 25, pp. 2268–2273.

K. Sutter et al, "Photorefractive gratings in the organic crystal 2-cyclooctylamino-5-nitropyridine doped with 7,7,8,8-tetracyanoquinodimethane", Journal of the Optical Society of America B, vol. 7, No. 12, pp. 2274–2278 (Dec. 1990).

S. Ducharme et al, "Observation of the Photorefractive Effect in a Polymer", Physical Review Letters, vol. 66, pp. 1846–1849 (Apr. 8, 1991).

K. Tamura et al, "New polymeric material containing the tricyanovinylcarbazole group for photorefractive applications", Applied Physics Letters, vol. 60, No. 15, pp. 1803–1805 (Apr. 13, 1992).

Y. Cui et al, "Photorefractive effect in a new organic system of doped nonlinear polymer", Applied Physics Letters, vol. 61, pp. 2132–2134 (Nov. 2, 1992).

B. Kippelen et al, "Photorefractivity in a functional side-chain polymer", Physical Review B, vol. 48, No. 15, pp. 10710–10717 (Oct. 15, 1993).

M.C.J.M. Donkers et al, "Net two-beam coupling gain in a polymeric photorefractive material", Optical Letters, vol. 18, No. 13, pp. 1044–1046 (Jul. 1, 1993).

B. Kippelen et al, "New highly efficient photorefractive polymer composite for optical-storage and image-processing applications", Electronics Letters, vol. 29, pp. 1873–1874 (Oct. 14, 1993).

M. Liphardt et al (S. Ducharme), High-Performance Photorefractive Polymers, Science, vol. 263, pp. 367–369 (Jan. 21, 1994).

W.E. Moerner et al, "Orientationally enhanced photorefractive effect on polymers", Journal of the Optical Society of America B, vol. 11, No. 2, pp. 320–330 (Feb, 1994).

M.E. Orczyk et al, CLEO '93, "Photorefractive effect in fullerene-doped polymer composite", p. 518–519 (1993).

B. Kippelen et al, "Photorefractive effect in a poled polymer containing the tricyanyvinylcarbazole group", Journal of Applied Physics, vol. 74, No. 5, pp. 3617–3619 (Sep. 1, 1993).

Sandalphon et al, "Dual-grating formation through photorefractivity and photoisomerization in azo-dye-doped polymers", Optics Letters, vol. 19, No. 1, pp. 68–70 (Jan. 1, 1994).

Z. Sekkat et al, "Photoassisted Poling of Azo Dye Doped Polymeric Films at Room Temperature", Applied Physics B, vol. 54, pp. 486–489 (1992).

S.M. Silence et al, "Subsecond grating growth in a photorefractive polymer", Optics Letters, vol. 17, No. 16, pp. 1107–1109 (Aug. 15, 1992).

S.M. Silence et al, "Nonlinear optical properties of photorefractive polymers", Proc. SPIE, (OE/LASE '93) (1993).

P. Gunter et al, *Photorefractive Materials and Their Applications*, vol. I and II, Editor: Springer Verlag, Berlin, pp. 1–5 (1988–89).

K. Tamura et al, "New polymeric material containing the tricyanovinylcarbazole group for photorefractive applications", Applied Physics Letters, vol. 60, No. 15, pp. 1803–1805 (Apr. 13, 1992).

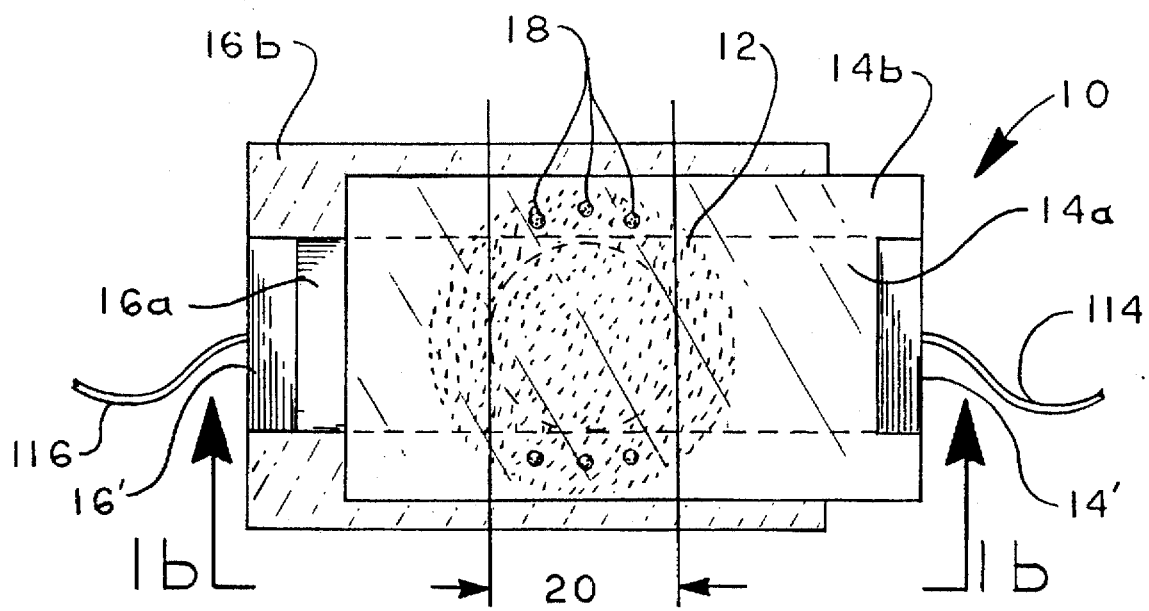
FIG. IA
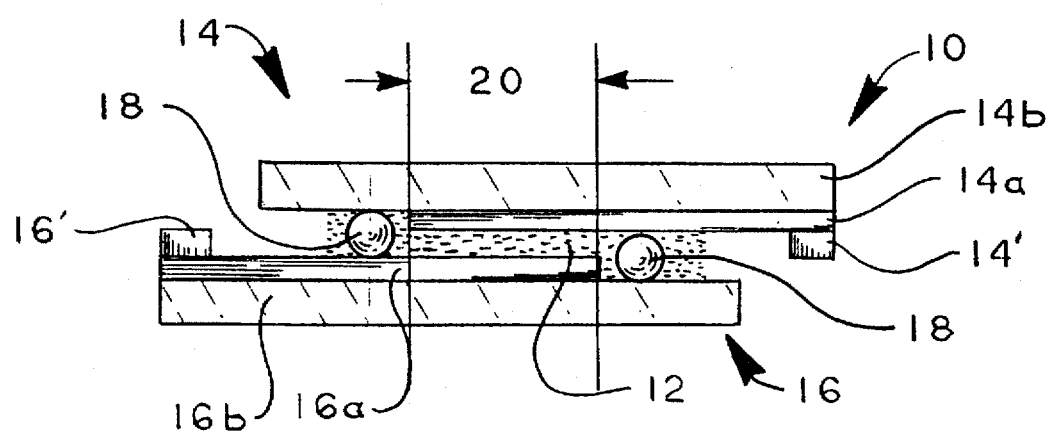
FIG. IB

FIG. 6A
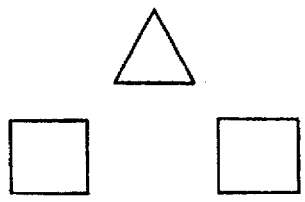
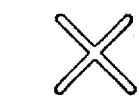
FIG. 6B
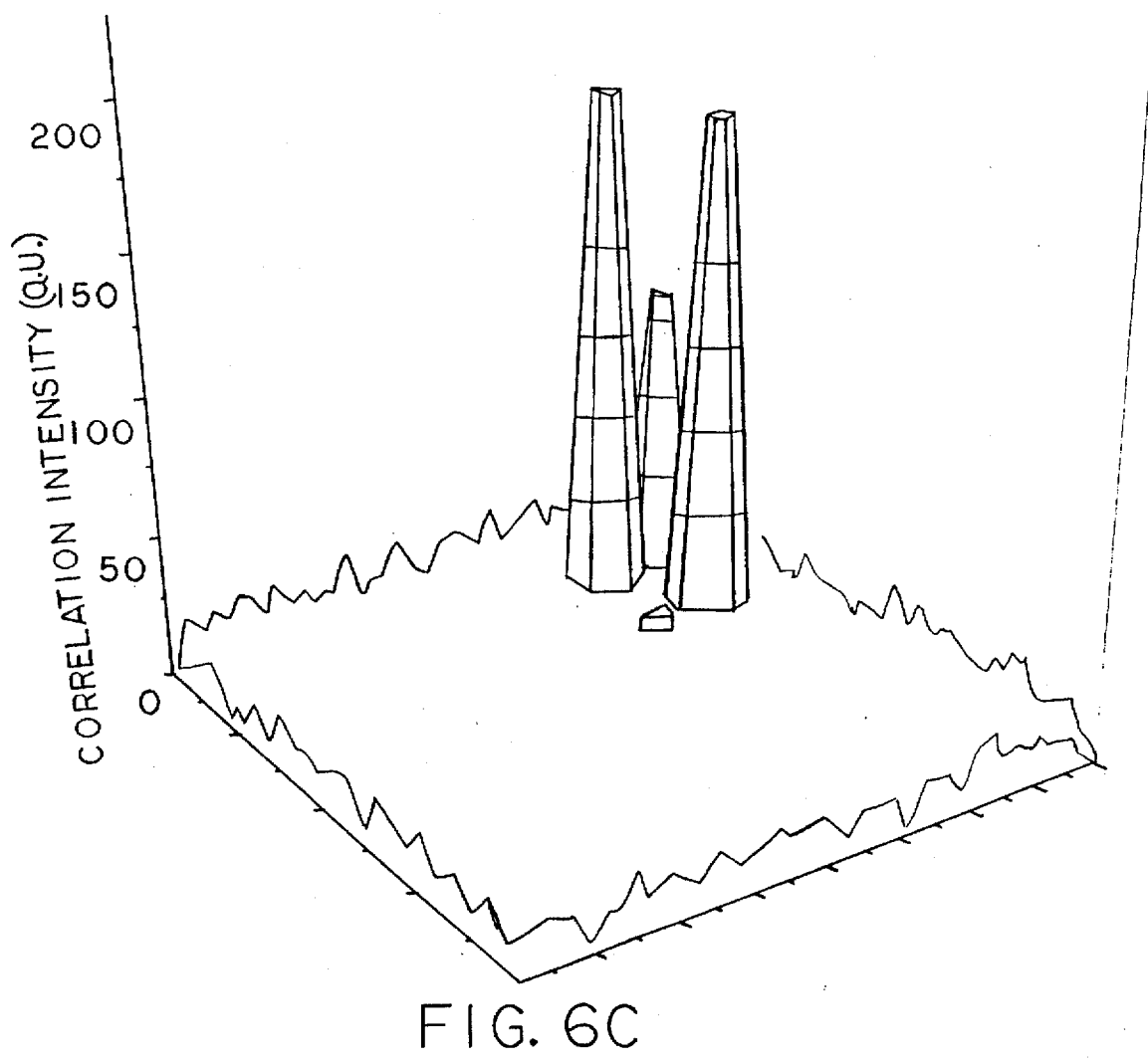
FIG. 6C

AZO-DYE-DOPED PHOTOREFRACTIVE POLYMER COMPOSITES FOR HOLOGRAPHIC TESTING AND IMAGE PROCESSING

This is a continuation of application Ser. No. 08/321,737 filed on Oct. 12, 1994, now abandoned.

ORIGIN OF INVENTION

This invention was made with Government support under Grant No. AFOSR F49620-93-1-0199 awarded by the Air Force Office of Scientific Research and under Grant No. ECS-9408810 awarded by the National Science Foundation. The Government has certain rights in this invention.

TECHNICAL FIELD

The present invention relates to a device based on photorefractive (PR) polymer composites for modulating electromagnetic irradiation and storing optical information. More particularly, the invention relates to the fabrication of holographic devices comprising a polymer or polymer composite with a glass transition temperature below or near above room temperature sandwiched between transparent electrodes.

BACKGROUND ART

The photorefractive effect arises in electrooptic materials when charge carriers are photogenerated in the bright regions of a light intensity pattern formed by two interfering coherent light beams in the material. The charge carriers separate by drift and/or diffusion and form a non-uniform internal electric field (space-charge field) that modulates the refractive index in the material. The resulting index pattern constitutes a grating that can diffract light. Due to the charge separation in PR materials, a phase shift occurs between the original light fringe pattern and the generated index grating. This phase shift is a unique feature of the PR effect, distinguishing it from any other mechanism that gives rise to a light-induced refractive index modulation. It enables energy transfer between two coherent light beams, the so-called "two-beam-coupling" (2BC), with one beam gaining energy at the expense of the other.

Photorefractivity has been first observed with lithium niobate ($LiNbO_3$). Subsequently, further studies were performed with other inorganic crystals such as ferroelectrics ($BaTiO_3$, $LiTaO_3$, etc.) or sillenites ($Bi_{12}SiO_{20}$ (BSO), $Bi_{12}GeO_{20}$ (BGO), $Bi_{12}TeO_2O$ (BTO), etc.), doped semiconductors (GaAs:Cr, InP:Fe, etc.), and semiconductor multiple quantum wells. The optimization of the efficiency of these inorganic materials for PR applications is limited in these materials because large electrooptic (EO) coefficients are usually accompanied by a large dc dielectric constant $\epsilon$, leaving the commonly used figure of merit for the PR effect ($n^3 r/\epsilon$) more or less constant in most materials. Moreover, growth, cutting and polishing of such crystals is expensive.

Organic PR materials can have both good EO properties and low dielectric constants $\epsilon$, resulting in a possibly higher PR figure of merit. The first example for photorefractivity in an organic material has been the molecular single crystal 2-cyclooctylamino-5-nitropyridine doped with 7,7,8,8-tetracyano-quinodimethane (TCNQ) (K. Sutter et al). The first observation of the PR effect in a polymer was reported by S. Ducharme et al at IBM Almaden, S. Ducharme et al, *Physical Review Letters*, Vol. 66, pp. 1846–1849 (1991). Since then, PR polymers have attracted strong interest; see, e.g., K. Tamura et al, "New polymeric material containing the tricyanovinylcarbazole group for photorefractive applications", *Applied Physics Letters*, Vol. 60, No. 15, pp. 1803–1805 (Apr. 13, 1992); Y. Cui et al, *Applied Physics Letters*, Vol. 61, pp. 2132–2134 (1992); B. Kippelen et al, "Photorefractivity in a functional side-chain polymer", *Physical Review B*, Vol. 48, No. 15, pp. 10710–10717 (Oct. 15, 1993); M. C. J. M. Donkers et al, "Net two-beam-coupling gain in a polymeric photorefractive material", *Optical Letters*, Vol. 18, No. 13, pp. 1044–1046 (Jul. 1, 1993); B. Kippelen et al, "New highly effective photorefractive polymer composite for optical-storage and image-processing applications", *Electronics Letters*, Vol. 29, pp. 1873–1874 (1993); M. Liphard et al, *Science*, Vol. 263, pp. 367–369 (1994); and W. E. Moerner et al, *Journal of the Optical Society of America B*, Vol. 11, pp. 320–330 (1994). These photorefractive polymers offer better structural flexibility, easier processing, and lower cost compared with commonly used inorganic crystals.

To be photorefractive, a material must combine photosensitivity, photoconductivity, and a field-dependent refractive index. Most commonly, the latter requirement is achieved through the electrooptic (EO) effect (Pockels), resulting from the second-order, non-linear optical properties of the material. One way to obtain such a multifunctionality is by dissolving low-molecular-weight functionalized compounds in a (functionalized) polymer, the so-called guest/host approach.

The second-order active molecules/moieties consist of a π-bridge substituted with an electron donor (D) and an electron acceptor (A), one on each end, thus having a strong, permanent dipole moment. Such molecules are colored and are referred to as EO "chromophores" or "dyes". To obtain a macroscopic EO effect in the material, the originally randomly oriented EO chromophores have to be aligned, e.g., by an electric field ("poling"). Besides the alignment of the chromophores, the field also assists the charge photogeneration according to Onsager's theory by reducing the recombination probability of the charge carrier. Furthermore, it provides the net force for the drift of the carriers, leading to an internal space-charge field in the material. If the samples are poled by the total electric field $E_{tot}$, which is the superposition of the uniform external field $E_{dc}$ applied to the ITO electrodes and the non-uniform internal space-charge field $E_{SC}$ which develops in the material after non-uniform illumination ($E_{tot}=E_{dc}+E_{sc}$), a spatially varying orientation of the molecular dipoles throughout the material is obtained as a result. Any effect quadratic in the total electric field will then contribute to the refractive index modulation at the spatial frequency of the space-charge field due to cross products of uniform and spatially modulated fields. Thus, not only the EO coefficient, but also the birefringence (BR) of the material is modulated, yielding an enhanced photorefractive effect in comparison with PR materials using the same chromophore, but with a fixed structure where the orientation of the chromophore is unaffected by the electric field, such as in crystals or in permanently poled polymers. This phenomenon was discussed recently as the so-called "orientational enhancement mechanism"; see, W. E. Moerner et al, supra. Recent results by us demonstrated that the BR contribution to the total index modulation can be even dominant, depending on the molecular structure of the EO chromophore.

In order to take full advantage of the orientational enhancement mechanism, one has to be able to pole the material in real-time during recording, i.e., the glass transition temperature $T_g$ of the material has to be close above or even below the operating temperature, preferably room temperature for most applications. The non-linear chromophores already plasticize the polymer matrix. However, most chromophores with large EO coefficients are rather poor plasticizers due to their polarity, resulting in high melting points.

A number of references have disclosed the formation of a polymeric composite having the requisite properties. For example, U.S. Pat. No. 5,064,264, issued Nov. 12, 1991, discloses one such polymeric composite, comprising a polymer, a non-linear optical chromophore, and a charge transport agent. The chromophore and charge transport agent can be dispersed in the polymer binder or covalently linked to the polymer in the backbone or as a pendant group. Optionally, a charge generating agent can be added, either dispersed in the polymer binder or bonded to the polymer or to the chromophore. In order to possess a permanent second-order, non-linear optical response, the polymer must have a high glass transition temperature $T_g$, greater than 100° C. and preferably from about 150° to 400° C. and most preferably from about 250° to 350° C. Such a high $T_g$ is obtained by cross-linking the polymer. However, the diffraction efficiency suffers, and is at best about 0.1%.

In a series of patents by Schildkraut et al (U.S. Pat. Nos. 4,999,809, 5,115,336, and 5,184,323), a polymer composite having a similar composition to that of the '264 patent is disclosed. However, no meaningful refractivity data is provided.

The diffraction efficiency in these prior art PR polymers is less than 1%, thereby limiting the processibility of images.

Thus, a polymer composite having a high diffraction efficiency and capable of real-time poling at room temperature is desired.

DISCLOSURE OF INVENTION

It is an object of this invention to provide a photorefractive device based on a polymer composite comprising an electrooptic chromophore, a photoconductor, and a photosensitizer, the polymer composite having a glass transition temperature close to room temperature.

It is another object of the invention to provide a process for the fabrication of holographic devices with these photorefractive polymer composites.

It is a still further object of the present invention to use such holographic devices as erasable (reversible) recording media of thick phase holograms in real-time non-destructive holographic testing devices.

These and further objects are realized by the invention disclosed herein. In accordance with the invention, a polymer composite is provided, comprising a second-order, non-linear optical dye, a photoconductive polymer, a photosensitizer, and a low molecular weight (less than 1,000 g/mole) plasticizer. The polymer composite is useful as a holographic recording medium. The use of such plasticizers provides a photorefractive material having a $T_g$ below 45° C. and preferably near or below room temperature, for real-time image processing.

The holographic devices of the present invention comprise the photorefractive polymer composite sandwiched between two transparent electrodes such as indium tin oxide (ITO) coated glass slides. The constant thickness of the device is controlled by spherical calibrated microbeads used as spacers. The sensitivity of this holographic recording material is compatible with the wavelengths of commercially available semiconductor laser diodes emitting in the visible or in the near-infrared (IR) portions of the spectrum (600 to 850 nm). The internal diffraction efficiency of the holograms is close to unity when corrected for absorption and reflection losses and, therefore, a regular CCD camera can be used for the read-out of the holograms. The large diffraction efficiency is also very beneficial for multiplexing techniques in optical data storage. The retrieval efficiency for each individual hologram scales with $1/n^2$ where n is the number of holograms stored in the same spot (volume) of the material.

Another important application for PR polymers is real-time devices such as optical correlators.

There are several materials that are currently used for holographic applications, including silver halide photographical plates and thermoplastics. The technology of PR polymer composites has several advantages over existing holographic recording materials in the following areas:

Photographic materials need a slow multi-step development process. The hologram is not erasable ("read only"). It is a thin (submicrometer) amplitude hologram and the maximum diffraction efficiency is therefore limited to 6.25%, as is well-known in this art. Furthermore, thin layers can not store superimposed holograms, i.e., multiplexing of information is impossible.

Surface relief holograms obtained by deformation of thermoplastics are limited in resolution (800 lp/mm) and the response time is of the order of 20 seconds. Multiple charging of the thermoplastic film is required. Erasure can be performed by heating the material, but it is time consuming.

Photochromic materials possess low sensitivity and, therefore, require powerful laser sources. In photochromic gratings the diffraction efficiency is limited to 40%, as is well-known in this art.

Devices based on a PR polymer composite can be used to reversibly write thick phase holograms. Multiple holograms can be superimposed in the volume of the device. The erasure of information can be performed optically. The response time can be as fast as 100 ms, depending on the intensity of the light source used for writing, allowing real-time applications. No development steps are necessary. The fabrication of holographic devices consisting of ITO glass electrodes and the polymer can be performed easily and at low cost. The storage time of a hologram can be several hours. The sensitivity is high, enabling the use of low-power laser diodes.

BRIEF DESCRIPTION OF THE DRAWINGS

FIG. 1a is a top plan view, schematically depicting a holographic device based on photorefractive polymer composites;

FIG. 1b is a cross-sectional view of the holographic device of FIG. 1a, taken along the line 1a—1a;

FIGS. 6a–c depict the results of a correlation experiment, using the photorefractive polymer composite of the invention, in which FIG. 6a is an example of a reference image, FIG. 6b is an example of a database of images to be searched, and FIG. 6c is a three-dimensional plot, depicting the correlation of the images in FIGS. 6a and 6b, in which the two large peaks are the correlation intensity between identical images of a square.

BEST MODES FOR CARRYING OUT THE INVENTION

Figure 2:
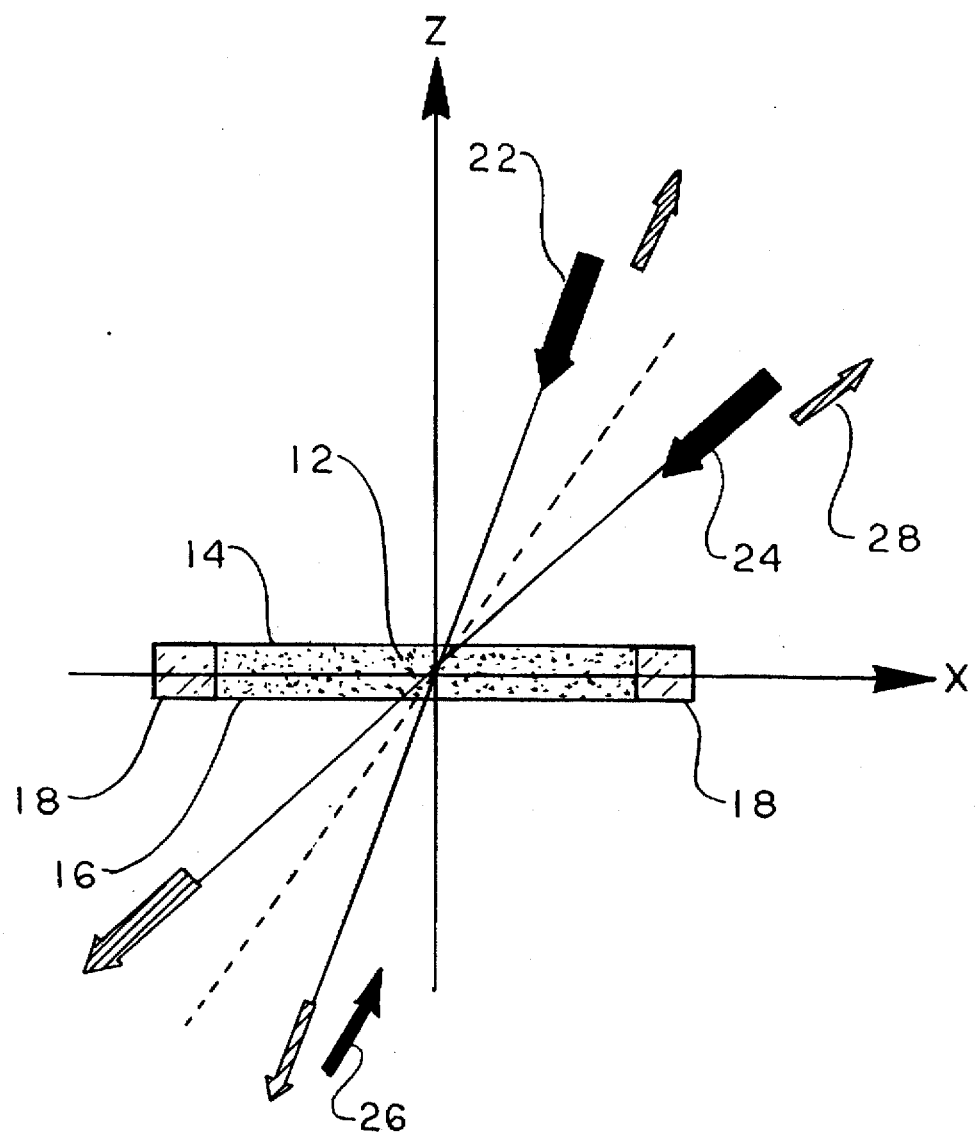
FIG. 2 depicts the experimental geometry employed relative to the holographic device and the relationships of the various beam angles in coordinate space.

The present invention relates to the fabrication of holographic devices 10 as shown in FIGS. 1a–b, comprising a thick polymer composite film 12 (tens to hundreds of μm) sandwiched between two transparent electrodes 14, 16, such as a layer of indium tin oxide (ITO) 14a, 16a supported on glass plates 14b 16b, respectively. Contact electrodes 14', 14' make contact to the transparent electrically conducting material 14a, 14b, respectively. Electrical wires 114, 116 connect the respective contact electrodes to a means for applying an external field (not shown). Glass spacers 18 are used to separate the two transparent electrodes 14, 16, and the polymer composite film 12 fills the space provided by the glass spacers. An active region 20 is defined by that area where the two layers of electrically conducting material 14a, 14b overlap.

The polymer composite 12 is a mixture of a polymeric photoconductor, a photosensitizer, a second-order, nonlinear chromophore, and one or more plasticizers to provide a low $T_g$ of the composite. The photosensitizer can be chosen among different possible candidates in order to tune the sensitivity to the desired light wavelength. The composite has a glass transition temperature close to room temperature. Specifically, the glass transition temperature $T_g$ is below 45° C., and is preferably at or near, even below, room temperature.

The polymeric photoconductor may comprise any of the well-known polymeric photoconductors, such as poly(N-vinylcarbazole) (PVK). The charge transfer complex that PVK forms with 2,4,7-trinitro-9-fluorenone (TNF) provides photosensitivity in the visible spectrum; the complex is depicted as:

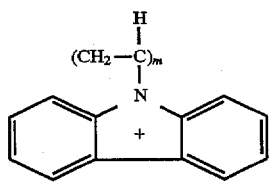

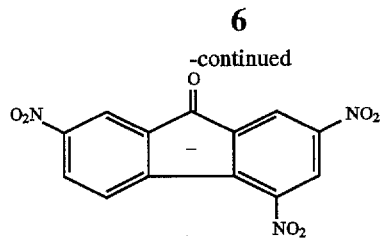

PVK:TNF

The PVK:TNF system is widely used as an organic photoconductor in the photocopier industry or in thermoplastic holographic recording plates and is preferably employed in the practice of the present invention. The second-order, non-linear optical properties are introduced by incorporating a second-order active chromophore in the polymer.

Other polymeric photoconductors useful in the practice of the invention include other aromatic amines, such as triphenylamine, derivatives of carbazole, and conjugated polymers, such as poly(3-alkylthiophene)s and derivatives of polyphenylenevinylene. Such derivatives are well-known in this art. In the case of triphenylamine and carbazoles, the polymer backbone may be vinyl, acrylate, or methacrylate.

Examples of additional strong electron acceptors to form a charge transfer complex include 2,4,7-trinitro-9-fluorenylidene malononitrile and tetracyanoquinodimethane (TCNQ). On the other hand, it is not necessary to form the charge transfer complex, and an independent photosensitizer, such as one of the fullerenes, may be employed instead. The amount of the photosensitizer, whether charge transfer complex or separate, is about 1 wt % or less in the polymer composite.

The second-order, non-linear chromophore is preferably an azo dye, having a wavelength of maximum absorption that is about 250 nm less than the operating wavelength. Examples of such azo dyes include 2,5-dimethyl-4-p-nitrophenylazoanisole (I) and 2,5-dimethyl-4-p-nitrophenylazoaniline (II).

 (I)

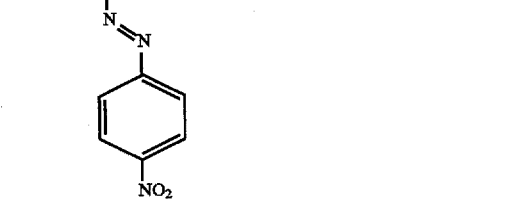 (II)

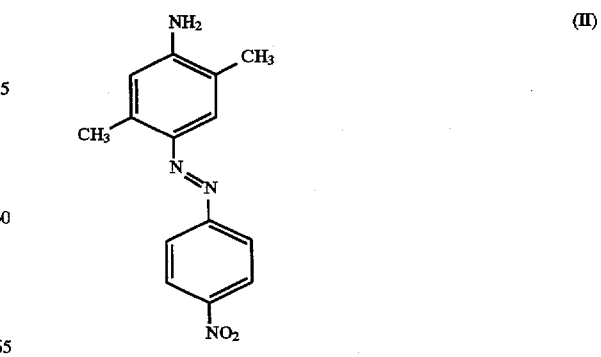

The concentration of the chromophore is desirably as high as possible, while avoiding self-aggregation problems and processibility that result from too high a concentration. Consistent with these considerations, the concentration of the chromophore is in the range of about 30 to 60 wt % of the polymeric composite.

The plasticizer is a low molecular weight (less than 1,000 g/mole) compound, and preferably incorporates at least one of the functions of photoconductivity and second-order optical non-linearity. Examples include carbazole, N-methylcarbazole, N-ethylcarbazole (ECZ), N-butylcarbazole, N-hexylcarbazole N-phenylcarbazole, o-nitroanisole, m-nitroanisole, p-nitroanisole, and triphenylamine. Preferably, the plasticizer is matched to the polymer, so that, for example, N-ethylcarbazole is employed in conjunction with poly(N-vinylcarbazole) and triphenylamine is employed in conjunction with a polymer containing triphenylamine.

The foregoing compounds act as plasticizers in addition to any plasticizing effect provided by the chromophore, and act to lower the glass transition temperature of the polymer composite close to room temperature, yielding a better processability of the material and, most importantly, allowing the orientational enhancement mechanism to provide excellent photorefractive properties. The amount of plasticizer is that sufficient to provide the desirably low glass transition temperature, and to a first approximation, may be estimated by the formula $$T_g = \Sigma x_i T_{gi}$$

where $x_i$ is the weight fraction of the $i^{th}$ component and $T_g$ is the glass transition temperature of the $i^{th}$ component. As a rough approximation, $T_g$ is about $\frac{2}{3} T_m$ for small molecules, where $T_m$ is the melting point. In the case of PVK and ECZ, a ratio of PVK:ECZ of 2:1 is advantageously employed.

The general composition of the photorefractive polymer composite is thus similar to other photorefractive polymer composites well-known in the prior art, except for the presence of the specific plasticizer. However, the presence of the plasticizer results in the desirably lower $T_g$, which enables real-time image processing by enabling poling at temperatures near room temperature. The refractive polymer composite also has an internal diffraction efficiency that approaches 100% when corrected for absorption and reflection losses, as discussed below.

DEVICE FABRICATION

The polymer composite 12 is prepared by dissolving appropriate amounts of the different components in dichloromethane. The solution is then passed through a 1 µm filter and the solvent is removed. The resulting solid is ground into a fine powder. The powder is then placed between two indium tin oxide (ITO) electrodes 14a, 16a etched on transparent glass slides 14b, 16b, respectively, and heated on a hot plate to 160° C. until the polymer mixture becomes a viscous liquid. Glass beads 18 with a calibrated diameter are used as spacers. Uniformly thick samples of good optical clarity are obtained. The external electric field needed for the carrier photogeneration, transport, and poling is applied to the ITO electrodes 14a, 14b, i.e., perpendicular to the sample surface.

DEVICE CHARACTERIZATION

The devices are characterized by performing degenerate four-wave mixing (DFWM) and two-beam coupling (2BC) experiments. Holograms are written by overlapping two coherent "writing beams" 22, 24 (intensity ratio β, typically ≈1) with an external angle of 2θ (typically 15° to 30°) in the sample to create a fringe pattern. They are both either "s"- or "p"-polarized (perpendicular or parallel, respectively, to the plane defined by the incoming beam and the sample normal). In order to have a non-zero component of the external field along the grating wave vector K, the experiments are performed in a tilted geometry (tilt angle Ψ, typically 45° to 60°) to permit drift of the carriers along the grating vector. Due to the symmetry of poled polymers, the results depend on the polarization of the light used to write or read the information. Further important parameters are the power density of the writing beams, the applied external field V, and the interaction length of the light with the PR medium.

In the DFWM experiments, index gratings recorded in the PR material by two equally strong s-polarized beams 22, 24 are probed by a weak p-polarized beam 26, counter-propagating with the writing beam 22 (FIG. 2), and the intensity of the transmitted and the diffracted light are monitored. The diffraction efficiency is defined as the intensity ratio of the diffracted beam 28 and the incident reading beam 26. Storage time measurements are performed by blocking simultaneously all beams and by restoring only the reading beam 26 after a given time interval.

For the two-beam coupling (2BC) experiments, the two writing beams 22, 24 are p-polarized and the counter-propagating beam 26 is absent. The transmitted intensity of the amplified beam (e.g., 2Ψ*) is measured when the other beam (e.g., 22) is "on" or "off", respectively. The normalized gain coefficient Γ is deduced from the experimentally measured amplification factor γ according to:

$$\Gamma = [ln\Gamma - ln(2-\gamma)]/(d\cos\Psi)$$

where d is the thickness of the sample and Ψ the tilt angle.

RESULTS AND PERFORMANCE

The diffraction efficiency and the 2BC gain were measured as a function of the applied field. We present here the results obtained with the composite consisting of poly(N-vinylcarbazole) (PVK), 2,4,7 trinitro-9-fluorenone (TNF), N-ethylcarbazole, and 2,5 dimethyl-4-(p-nitrophenylazo) anisole (DMNPAA; I). The composition was DMNPAA:PVK:ECZ:TNF 50:33:16:1 wt %. The thickness of the films was 105 µm. All experiments were performed with a semiconductor laser diode emitting at 675 nm. The external angles were 2θ=22° and Ψ=60°, corresponding to a grating spacing of 3.16 µm. The power density of the writing beams was 1 W/cm².

Without an applied field, no grating could be detected, indicating that the polymer did not show any absorption gratings due to reversible photoisomerization processes or permanent photochemical gratings. When an external field was applied a PR grating developed in the polymer.

Figure 3:
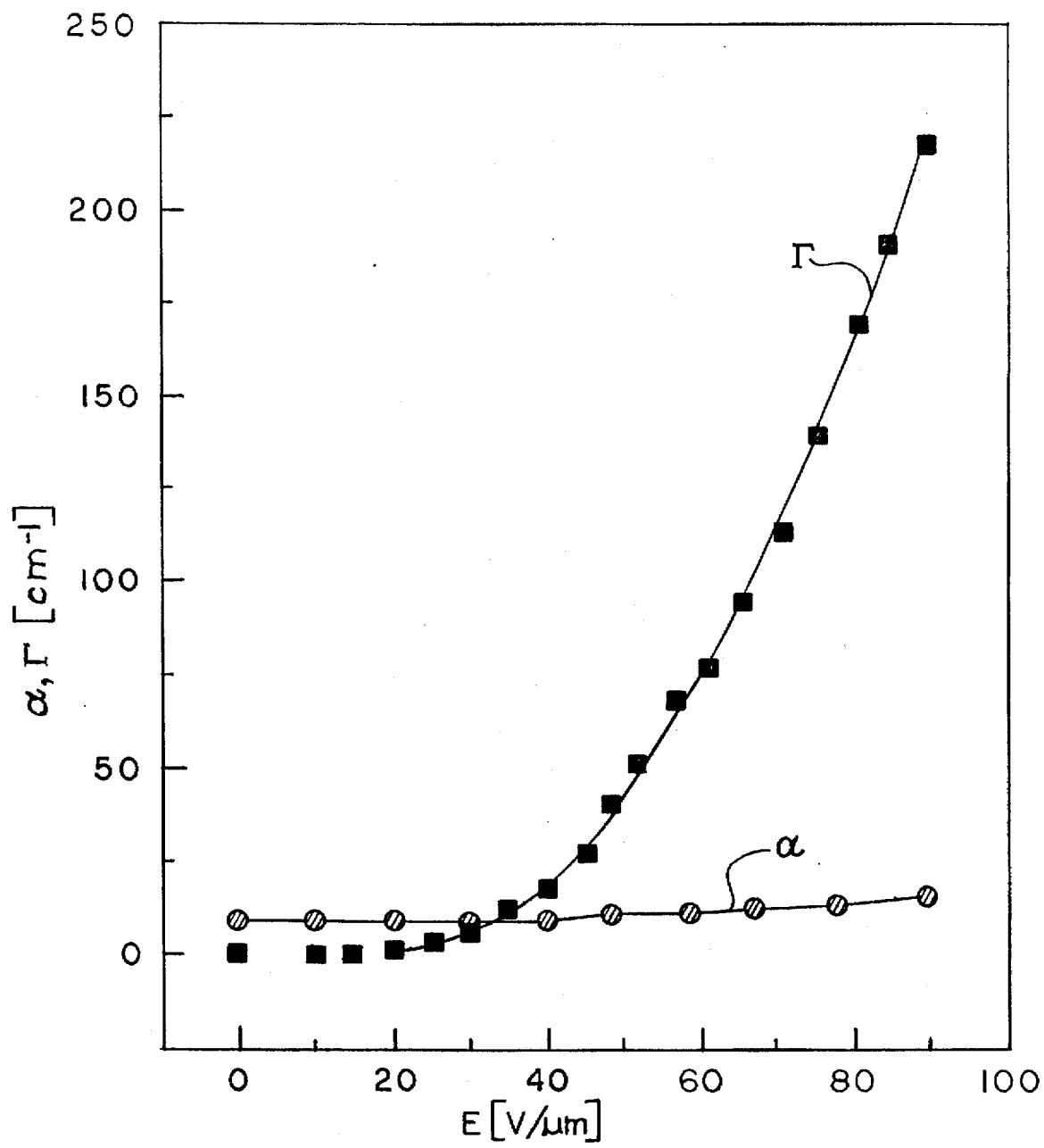
FIG. 3, on coordinates of gain coefficient ($\Gamma$, in cm$^{-1}$) and absorption ($\alpha$, in cm$^{-1}$) and external applied field (E, in V/µm), is a plot of the results of a two-beam-coupling experiment using one particular photorefractive polymer composite in accordances with the invention, showing that the gain coefficient is larger than the absorption for applied fields larger than about 30 V/µm.

The result of the 2BC experiments are shown in FIG. 3. The steady-state gain coefficient for Γ is seen to increase monotonically with the external field, yielding Γ=220 cm⁻¹ at E=90 V/µm. The gain by far exceeds the absorption in the sample at this voltage (α=13 cm⁻¹), giving a net optical gain of $\Gamma_{net}$=207 cm⁻¹.

Figure 4:
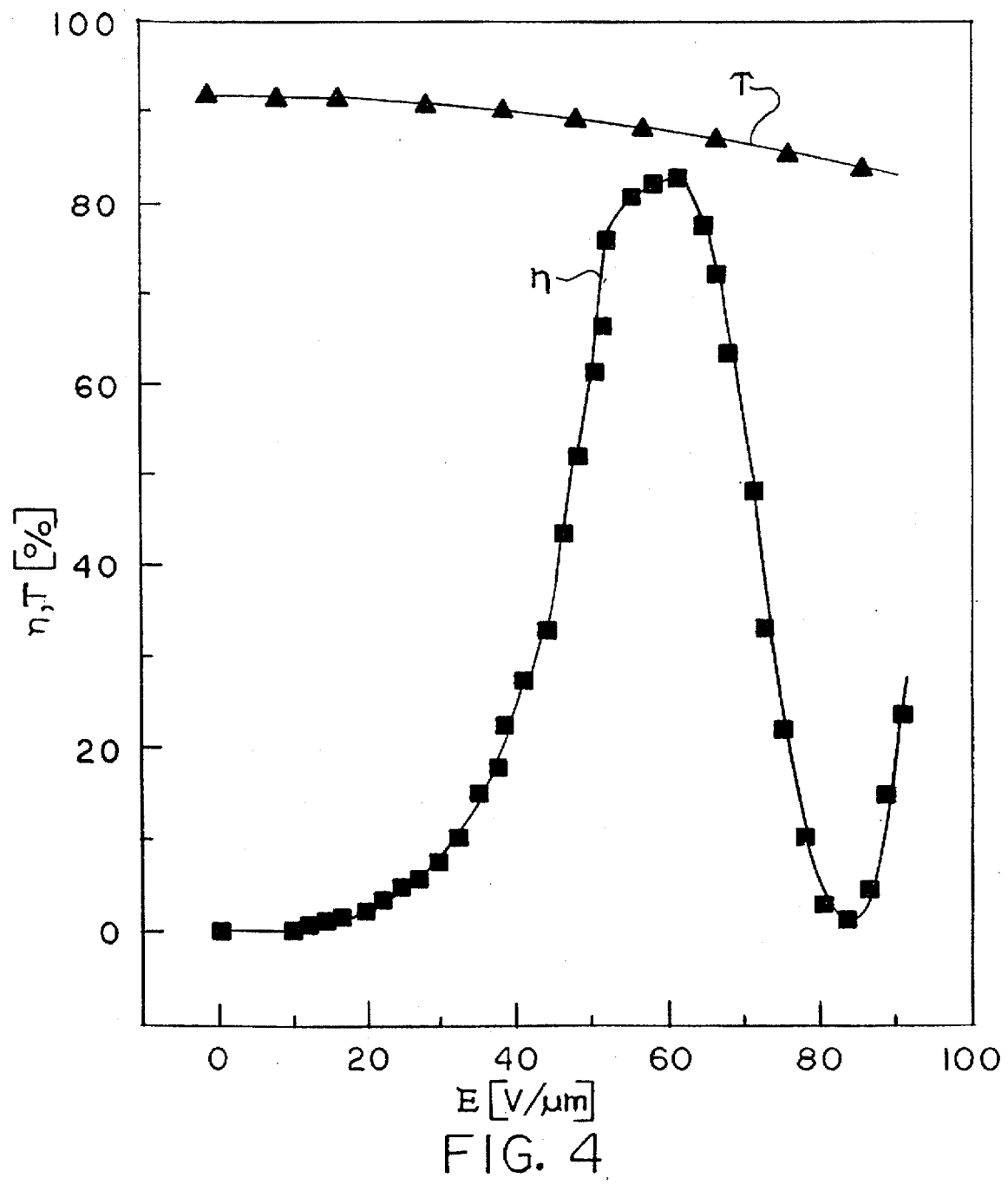
FIG. 4, on coordinates of diffraction efficiency (η, in %) and external applied field (E, in V/μm), is a plot showing the results of a degenerate four-wave-mixing experiment using the same photorefractive polymer composite as in FIG. 3, showing the dependence of efficiency as a function of the applied field.

FIG. 4 shows the DFWM results for p-polarized readout. The efficiency $\eta_p$ increases with the electric field and reaches a maximum of 86% at E=61 V/µm, and the light is completely diffracted. Further increase of the field leads to periodic energy transfer between the diffracted and the transmitted beam; at E=81 V/µm, all light is again directed into the original probe wave. The sum of diffracted and transmitted signals gradually decreases as the external field increases ($\Delta\alpha=5$ cm$^{-1}$ at 90 V/μm). This is due to electric field-induced absorption changes in the sample as we verified by an independent transmission measurement in the absence of the writing beams. Similar experiments were performed for s-polarized readout (not shown). The diffraction efficiency is smaller than for p-polarized readout and no maximum was observed for fields up to 90 V/μm.

The dynamics of grating formation is complex. The speed depends upon the applied electric field, the light intensity, and the grating spacing. Under our experimental conditions and at 90 V/μm the index modulation amplitude rises to ≠95% of the steady-state value within approximately 100 msec, reaching this limit after 10 sec. The efficiency of the grating drops to 15% of the maximum value within 24 hours after all beams and the electric field were switched off. The recorded index pattern can be erased by uniform illumination.

The values for the diffraction efficiency and gain coefficient found in our composite represent, by far, the highest reported for organic PR materials to date. They originate from refractive index modulations as large as $10^{-2}$ that can be reversibly generated in the material. Table 1 compares our material with different other published PR polymers. Compared with inorganic crystals, our PR composite shows that the formation of extremely large index modulations is possible, but the sensitivity is worse than in the crystals (Table 2).

TABLE 1

Comparison with Other Photorefractive Polymers

| Material (wt % dye) | d (μm) | E (V/μm) | η (%) | Γ (l/cm) | Abs. (l/cm) | λ (nm) | Λ (μm) | ψ |
|---|---|---|---|---|---|---|---|---|
| Present invention: | 105 | 40 | 24 | 25 | 11 | 675 | 1.58 | 60 |
| DMNPAA/PVK/ECZ/TNF | 105 | 60 | 86 | 70 | 12 | 675 | 1.58 | 60 |
| (50) | 105 | 90 | 27 | 220 | 13 | 675 | 1.58 | 60 |
|  | 105 | 40 | 13 |  |  | 675 | 1.58 | 45 |
| Prior Art: | 125 | 40 | 0.85 | 11.0 | 32 | 647 | 1.60 | 45 |
| F-DEANST/PVK/TNF | 125 | 40 | 1.2 | 9.9 | 17 | 676 | 1.67 | 45 |
| (33)[1] | 125 | 40 | 0.1 | 8.6 | 1.4 | 850* | 1.86 | 45 |
| DEANST/PVK/C$_{60}$ (>20)[2] | ≈300 | 50 | 1.5 | 3.9 |  | 645 | 1.5 | 45 |
| BisA-NAS/DEH (≈32)[3] | 145 | 35 | 0.5 | 30 | 220 | 650 | 2.6 | 40 |

Notes:
[1]M.C.J.M Donkers, Optics Letters, Vol. 18, p. 1044 (1993).
[2]M. E. Orcziek et al, CLEO '93.
[3]S. Ducharme et al, Science, Vol. 263, p. 367 (1994). The power density for writing is 1 W/cm$^2$ in all cases except * 0.2 W/cm$^2$.

TABLE 2

Comparison of the Photorefractive Sensitivities of Various Photorefractive Materials

| Material | E (V/μm) | $(S_{n1})^{-1}$ (kJ/cm$^3$) | $(S_{n2})^{-1}$ (kJ/cm$^2$) | $(S_{\eta 1})^{-1}$ (mJ/cm$^2$) | $(S_{\eta 2})^{-1}$ (mJ/cm) |
|---|---|---|---|---|---|
| LiNbO$_3$[1] | 0 | 20–200 | — | 1000 | 300 |
|  | 5 | — | 6 | — | — |
| BaTiO$_3$[1] | 0 | — | — | 50–1000 | — |
|  | 1 | — | — | 0.1–10 | — |
| SBN[1] | 0 | 12–75 | 7–30 | 2.5–15 | 1.6–6 |
| BSO[1] | 0.6 | 0.014 | 0.006 | 0.7 | 0.3 |

TABLE 2-continued

Comparison of the Photorefractive Sensitivities of Various Photorefractive Materials

| Material | E (V/μm) | $(S_{n1})^{-1}$ (kJ/cm$^3$) | $(S_{n2})^{-1}$ (kJ/cm$^2$) | $(S_{\eta 1})^{-1}$ (mJ/cm$^2$) | $(S_{\eta 2})^{-1}$ (mJ/cm) |
|---|---|---|---|---|---|
| KNbO$_3$[1] | 0 | 6–60 | 0.1 | — | — |
|  | 0.7 | 0.08 | 0.02 | — | — |
| PVK:TNF/F-DEANST[1] | 40 | 100 | 5.9 | 1700 | 100 |
| PVK:TNF/ECZ/DMNPAA[2] | 40 | 5.5 | 0.23 | 130 | 5.4 |

Figure 5:
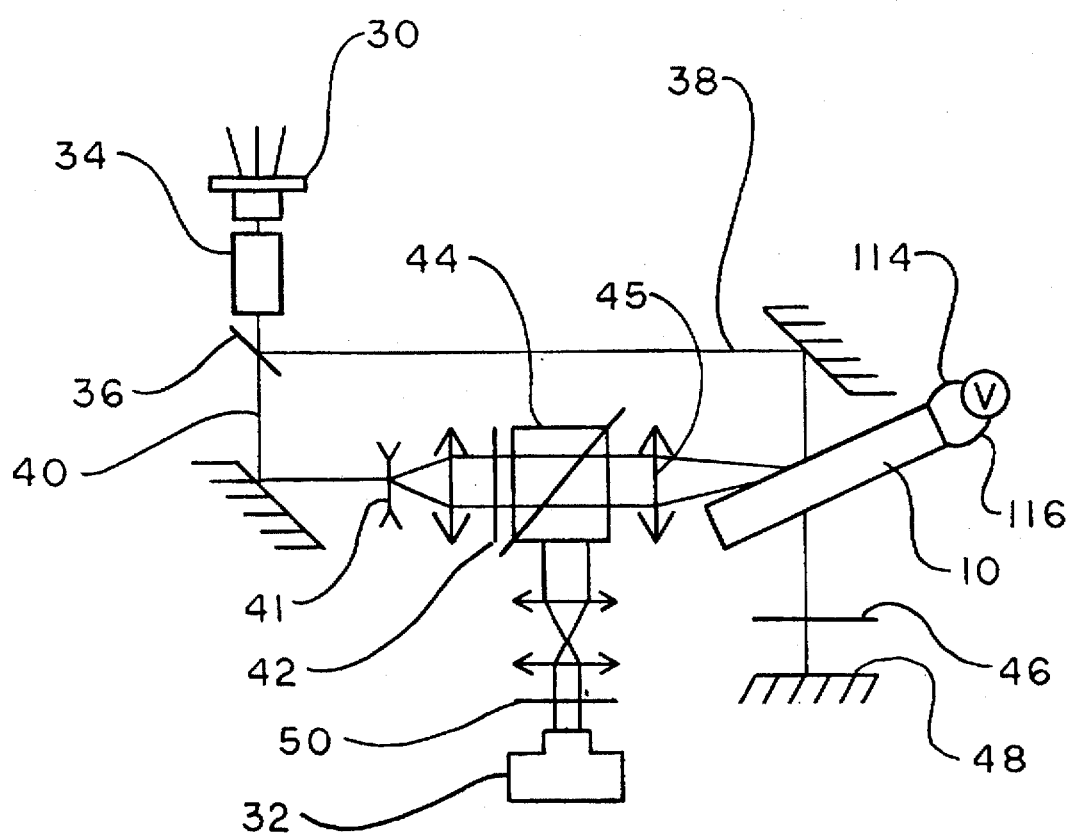
FIG. 5 is a schematic diagram, depicting the holographic set-up to record a hologram on the holographic medium of the invention.

Notes: $S_{n1} = (1/\alpha)(\partial n_1/\partial W_0)$; $S_{n2} = (\partial n_2/\partial W_0)$; $S_{\eta 1} = (1/\alpha d)(\partial \eta^{1/2}/\partial W_0)$; $S_{\eta 2} = (1/d)(\partial_n^{1/2}/\partial W_0)$
[1]Prior Art;
[2]Present invention Demonstration of Real-Time Holographic Imaging and Optical Correlation Shown in FIG. 5 is a real-time holographic set-up using these new polymeric holographic devices 10, which has been developed in order to demonstrate the ability to write and read holograms in real time. The writing and the reading of the two dimensional holograms were performed by a semiconductor laser diode 30 (LaserMax LAS200-675-5) with 9 mW output power at 675 nm. The imaging of the readout of the holograms was performed with a regular CCD camera 32. Following conventional collimating optics 34, a conventional beamsplitter 36 was used to form the reference beam 38 and object beam 40 (both s-polarized). The object beam 40 is expanded by beam expander 41 and passes through the image 42 to be recorded, through a polarizing beamsplitter 44 and is focused by focus means 45 onto the holographic device 10, where it interacts with the reference beam 38 to form a holographic image. The image is reconstructed and sent to the camera 32 via that portion of the reference beam 38 passing through the holographic device 10 and a quarter-wave plate 46 being reflected back by a mirror 48 and again through the quarter-wave plate 46. The diffracted beam (now p-polarized) passes through the polarizing beam splitter 44 and is sent to an analyzer 50 in front of the camera 32, where it is recorded.

Bright and sharp images of the stored holograms could be reconstructed on the CCD camera The resolution of the material was determined with a standard U.S. Air Force target to 32 lp/mm. Taking into account that the information was focused onto the material, this corresponds to a resolution of about 3 μm in the material, i.e., comparable with the grating spacing.

The femtosecond operation of an optical correlator using the PR polymer was also demonstrated with a holographic device, such as depicted in FIG. 2, using the photorefractive polymer composite of the invention. FIG. 6a is the reference image, a square, and FIG. 6b is the data field that is searched, consisting of two squares, a triangle, and an X. FIG. 6c is a three dimensional plot of the correlation in which the peak height corresponds to the intensity of the correlation signal. The two squares generate the largest correlation signal, and the X the smallest signal; the triangle is intermediate, resembling the square in overall size (and having its base the same dimension as one side of the square), but having a different shape. The signal to noise ratio is greater than 10:1.

SYNTHESIS OF AZO DYES p-Nitrobenzenediazonium tetrafluoroborate was synthesized from p-nitroaniline and sodium nitrite ($NaNO_2$) in fluoroboric acid ($HBF_4$). All the azo dyes employed in the practice of the invention were synthesized in the following manner: 10 g p-nitrobenzenediazonium tetrafluoroborate (0.042 moles) were dissolved in 150 ml acetonitrile. 0.063 moles of 2,5-dimethylanisole or 2,5-dimethyl aniline was dissolved in acetonitrile (50 ml) and 30 drops of acetic acid were added. The 150 ml solution of diazonium salt was added dropwise to the other solution at room temperature and the solution was allowed to stir overnight. The reaction was then quenched with 200 ml of a 1:1 methanol:water solution. The precipitate was collected and washed several times with 0.1M NaOH and then water until neutral. The yield was 90%.

The general formula of the azo dyes useful in the practice of the invention is given by

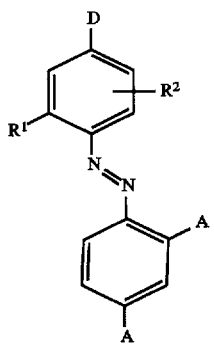

where A is —H, —$NO_2$, —CN, —Cl, —C(CN)=C(CN)$_2$ (tricyanovinyl), —$SO_3R$ (sulfonato), or —$COOCH_3$, with the proviso that at least one A is not —H; D is —$OR^3$ or —$NR^3{}_2$, R, $R^1$ and $R^2$ are independently —H, $C_{1-6}$ alkyl, or $C_{1-6}$ alkoxy, and $R^3$ is $C_{1-6}$ alkyl.

Formation of the tricyanovinyl- and sulfonato-containing dyes would require the use of a different diazonium starting compound than described above in the synthesis: p-tricyanovinylbenzenediazonium tetrafluoroborate and p-sulfonatobenzenediazonium tetrafluoroborate, respectively.

Where A is —$NO_2$, D is —$OCH_3$, $R_1$ is —$CH_3$, and $R_2$ is 2—$CH_3$ (that is, ortho to D), the compound is 2,5-dimethyl-4-p-nitrophenylazoanisole (I, above).

Where A is —$NO_2$, D is —$NH_2$, $R_1$ is —$CH_3$, and $R_2$ is 2—$CH_3$, the compound is 2,5-dimethyl-4-p-nitrophenylaniline (II, above).

Compounds in which D is —$OCH_3$ and R=R are considered to be novel chromophores.

Thus, there has been disclosed a photorefractive polymer composite, a holographic device incorporating the polymer composite, a method for preparing such a device, and novel second-order, non-linear azo chromophores. It will be readily appreciated by those skilled in this art that various changes and modifications of an obvious nature may be made, and all such changes and modifications are considered to fall within the scope of the invention, as defined by the appended claims.

What is claimed is:

1. A photorefractive polymer composite comprising a second-order, non-linear optical dye, a polymeric photoconductor, a photosensitizer, and a photoconductive plasticizer having a molecular weight of less than 1,000 g/mole, said refractive composite having a glass transition temperature, said photoconductive plasticizer acting to plasticize said photorefractive polymer composite beyond any plasticizing effect provided by said second-order, non-linear optical dye, said photoconductive plasticizer acting to lower said glass transition temperature such that said glass transition temperature is at or below about 20° C. and said photorefractive composite has a diffraction efficiency derived from the p-polarized readout that is greater than about 13% and approaches 100%.

2. The photorefractive polymer composite of claim 1 wherein said second-order, non-linear optical dye comprises a compound having the general formula

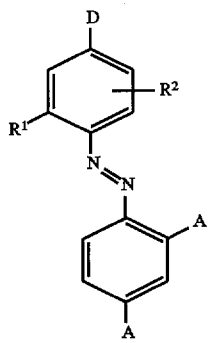

where A is —H, —$NO_2$, —CN, —Cl, —C(CN)=C(CN)$_2$, —$SO_3R$, or —$COOCH_3$, with the proviso that at least one A is not —H; D is —$OR^3$ or —$NR^3{}_2$; R, $R^1$ and $R^2$ are independently —H, $C_{1-6}$ alkyl, or $C_{1-6}$ alkoxy; and $R^3$ is $C_{1-6}$ alkyl.

3. The photorefractive polymer composite of claim 2 wherein said second order, non-linear optical dye is selected from the group consisting of 2,5-dimethyl-4-p-nitrophenylazoeinisole and 2,5-dimethyl-4-p-nitrophenylazoaniline.

4. The photorefractive polymer composite of claim 1 wherein said polymeric photoconductor has a polymeric backbone selected from the group consisting of vinyl, acrylate, and methacrylate, said backbone containing pendant groups selected from the group consisting of triphenyl amine and carbazoles.

5. The photorefractive polymer composite of claim 1 wherein said polymeric photoconductor is selected from the group consisting of poly(N-vinylcarbazole), poly(3-alkylthiophene)s, and polyphenylenevinylene.

6. The photorefractive polymer composite of claim 1 wherein said photosensitizer is either a charge transfer complex comprising said photoconductor and a strong electron acceptor or a separate photosensitizer molecule.

7. The photorefractive polymer composite of claim 6 wherein said strong electron acceptor is selected from the group consisting of 2,4,7-trinitro-9-fluorenone, 2,4,7-trinitro-9-fluorenylidene malononitrile, and tetracyanoquinodimethane and wherein said separate photosensitizer molecule consists essentially of a fullerene.

8. The photorefractive polymer composite of claim 7 wherein said charge transfer complex consists essentially of poly(N-vinylcarbazole):2,4,7-trinitro-9-fluorenone.

9. The photorefractive polymer composite of claim 1 wherein said photoconductive plasticizer is selected from the group consisting of carbazole, N-methylcarbazole, N-ethylcarbazole, N-butylcarbazole, N-hexylcarbazole N-phenylcarbazole, o-nitroanisole, m-nitroanisole, p-nitroanisole, and triphenylamine.

10. The photorefractive polymer composite of claim 1 wherein said dye is present in a concentration within a range of about 30 to 60 wt %, and said photosensitizer is present within a range of about 1 wt % or less.

11. A photorefractive polymer composite comprising a second-order, non-linear optical dye selected from the group consisting of 2,5-dimethyl-4-p-nitrophenylazoanisole and 2,5-dimethyl-4-p-nitrophenylazoaniline, a polymeric photoconductor consisting essentially of poly(N-vinylcarbazole), a photosensitizer consisting essentially of a charge transfer complex consisting essentially of said poly(N-vinylcarbazole) and 2,4,7-trinitro-9-fluorenone, and a plasticizer selected from the group consisting of N-ethylcarbazole, N-methylcarbazole, and N-phenylcarbazole, said photorefractive composite having a glass transition temperatures said plasticizer acting to plasticize said photorefractive polymer composite beyond any plasticizing effect provided by said second-order, non-linear optical dye, said plasticizer acting to lower said glass transition temperature to room temperature such that said glass transition temperature is at or below 20° C. and said photorefractive polymer composite has a diffraction efficiency derived from the 6-polarized readout that is greater than about 13% and approaches 100%.

12. The photorefractive polymer composite of claim 11 wherein said dye has a concentration of about 50 wt %, said poly(N-vinylcarbazole) has a concentration of about 33 wt %, said plasticizer has a concentration of about 16 wt %, and said photosensitizer has a concentration of about 1 wt %.

13. A holographic device comprising a photorefractive polymer composite sandwiched between two transparent electrically conducting electrodes, said photorefractive polymer composite comprising a second-order, non-linear optical dye, a polymeric photoconductor, a photosensitizer, and a photoconductive plasticizer having a molecular weight of less than 1,000 g/mole, said photorefractive composite having a glass transition temperature, said photoconductive plasticizer acting to plasticize said photorefractive polymer composite beyond any plasticizing effect provided by said second-order, non-linear optical dye, said photoconductive plasticizer acting to lower said glass transition temperature such that said glass transition temperature is at or below about 20° C. and said holographic device has a diffraction efficiency derived from the p-polarized readout that is greater than about 13% and approaches 100%.

14. The holographic device of claim 13 wherein said second-order, non-linear optical dye comprises a compound having the general formula

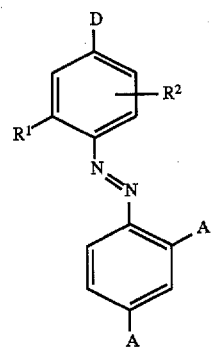

where A is —H, —NO$_2$, —CN, —Cl, —C(CN)=C(CN)$_2$ (tricyanovinyl), —SO$_3$R (sulfonato), or —COOCH$_3$, with the proviso that at least one A is not —H; D is —OR$^3$ or —NR$^3{}_2$; R, R$^1$ and R$^2$ are independently —H, Cl$_{1-6}$ alkyl, or C$_{1-6}$ alkoxy; and R$^3$ is C$_{1-6}$ alkyl.

15. The holographic device of claim 14 wherein said second-order, non-linear optical dye is selected from the group consisting of 2,5dimethyl-4-p-nitrophenylazoanisole and 2,5-dimethyl-4-p-nitrophenylazoaniline.

16. The holographic device of claim 13 wherein said polymeric photoconductor has a polymeric backbone selected from the group consisting of vinyl, acrylate, and methacrylate, said backbone containing pendant groups selected from the group consisting of triphenyl amine and carbazoles.

17. The holographic device of claim 13 wherein said polymeric photoconductor is selected from the group consisting of poly(N-vinylcarbazole), poly(3-alkylthiophene)s, and polyphenylvinylene.

18. The holographic device of claim 13 wherein said photosensitizer is either a charge transfer complex comprising said photoconductor and a strong electron acceptor or a separate photosensitizer molecule.

19. The holographic device of claim 18 wherein said strong electron acceptor is selected from the group consisting of 2,4,7-trinitro-9-fluorenone, 2,4,7-trinitro-9-fluorenylidene malononitrile, and tetracyanoquinodimethane and wherein said separate photosensitizer molecule consists essentially of a fullerene.

20. The holographic device of claim 19 wherein said charge transfer complex consists essentially of poly(N-vinylcarbazole):2,4,7-trinitro-9-fluorenone.

21. The holographic device of claim 13 wherein said photoconductive plasticizer is selected from the group consisting of carbazole, N-methylcarbazole, N-ethylcarbazole, N-butylcarbazole, N-hexylcarbazole N-phenylcarbazole, o-nitroanisole, m-nitroanisole, p-nitroanisole, and triphenylamine.

22. The holographic device of claim 13 wherein said transparent electrically conducting electrodes consist essentially of indium tin oxide.

23. The holographic device of claim 13 wherein said dye is present in a concentration within a range of about 30 to 60 wt %, and said photosensitizer is present within a range of about 1 wt % or less.

24. A holographic device comprising a photorefractive polymer composite sandwiched between two transparent electrically conducting electrodes, said photorefractive polymer composite comprising a second-order, non-linear optical dye selected from the group consisting of 2,5-dimethyl-4-p-nitrophenylazoanisole and 2,5-dimethyl-4-p-nitrophenylazoaniline, a polymeric photoconductor consisting essentially of poly(N-vinyl-carbazole), a photosensitizer consisting essentially of a charge transfer complex consisting essentially of said poly(N-vinylcarbazole) and 2,4,7-trinitro-9-fluorenone, and a photoconductive plasticizer selected from the group consisting of N-ethylcarbazole, N-methylcarbazole, and N-phenylcarbazole, said transparent electrically conducting electrodes consisting essentially of indium tin oxide, said photorefractive composite having a glass transition temperature, said photoconductive plasticizer acting to plasticize said photorefractive polymer composite beyond any plasticizing effect provided by said second-order, non-linear optical dye, said photoconductive plasticizer acting to lower said glass transition temperature such that said glass transition temperature is at or below 20° C. and said holographic device has a diffraction efficiency derived from the p-polarized readout that is greater than about 13% and approaches 100%.

25. The holographic device of claim 24 wherein said dye has a concentration of about 50 wt %, said poly(N-vinylcarbazole) has a concentration of about 33 wt %, said plasticizer has a concentration of about 16 wt %, and said photosensitizer has a concentration of about 1 wt %.

26. A method of fabricating erasable holographic recording devices for thick phase holograms comprising:
(a) providing a pair of transparent, electrically conducting electrodes;
(b) spacing said pair of transparent electrically conducting electrodes apart by a plurality of spacers to provide a space volume between said pair of transparent electrically conducting electrodes;
(c) filling said space volume with a photorefractive polymer composite, said photorefractive polymer composite comprising a second-order, non-linear optical dye, a polymeric photoconductive, a photosensitizer, and a photoconductive plasticizer having a molecular weight of less than 1,000 g/mole, said photorefractive composite having a glass transition temperature, said photoconductive plasticizer acting to plasticizer said photorefractive polymer composite beyond any plasticizing effect provided by said second-order, non-linear optical dye, said photoconductive plasticizer acting to lower said glass transition temperature such that said glass transition temperature is at or below about 20° C. and said erasable holographic recording device has a diffraction efficiency derived from the p-polarized readout that is greater than about 13% and approaches 100%.

27. The method of claim 26 wherein said second-order, non-linear optical dye comprises a compound having the general formula

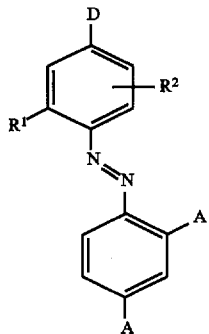

where A is —H, —NO$_2$, —CN, —Cl, —C(CN)=C(CN)$_2$ (tricyanovinyl), —SO$_3$R (sulfonato), or —COOCH$_3$, with the proviso that at least one A is not —H; D is —OR or —NR$^3{}_2$; R, R$^1$ and R$^2$ are independently —H, C$_{1-6}$ alkyl, or C$_{1-6}$ alkoxy; and R$^3$ is C$_{1-6}$ alkyl.

28. The method of claim 27 wherein said second-order, non-linear optical dye is selected from the group consisting of 2,5-dimethyl-4-p-nitrophenylazoanisole and 2,5-dimethyl-4-p-nitrophenylazoaniline.

29. The method of claim 26 wherein said polymeric photoconductor has a polymeric backbone selected from the group consisting of vinyl, acrylate, and methacrylate, said backbone containing pendant groups selected from the group consisting of triphenyl amine and carbazoles.

30. The method of claim 26 wherein said polymeric photoconductor is selected from the group consisting of poly(N-vinylcarbazole), poly(3-alkylthiophene) and polyphenylenevinylene.

31. The method of claim 26 wherein said photosensitizer is either a charge transfer complex comprising said photoconductor and a strong electron acceptor or a separate photosensitizer molecule.

32. The method of claim 31 wherein said strong electron acceptor is selected from the group consisting of 2,4,7-trinitro-9-fluorenone, 2,4,7-trinitro-9-fluorenylidene malononitrile, and tetracyanoquinodimethane and wherein said separate photosensitizer molecule consists essentially of a fullerene.

33. The method of claim 32 wherein said charge transfer complex consists essentially of poly(N-vinylcarbazole):2,4,7-trinitro-9-fluorenone.

34. The method of claim 26 wherein said photoconductive plasticizer is selected from the group consisting of carbazole, N-methylcarbazole, N-ethylcarbazole, N-butylcarbazole, N-hexylcarbazole N-phenylcarbazole, o-nitroanisole, m-nitroanisole, p-nitroanisole, and triphenylamine.

35. The method of claim 26 wherein said transparent electrically conducting electrodes consist essentially of indium tin oxide.

36. The method of claim 26 wherein said dye is present in a concentration within a range of about 30 to 60 wt %, and said photosensitizer is present within a range of about 1 wt % or less.

37. A method of fabricating erasable holographic recording devices for thick phase holograms comprising:
(a) providing a pair of transparent, electrically conducting electrodes consisting essentially of indium tin oxide;
(a) providing a pair of transparent, electrically conducting electrodes;
(b) spacing said pair of transparent electrically conducting electrodes apart by a plurality of spacers to provide a space volume between said pair of transparent electrically conducting electrodes;
(c) filling said space volume with a photorefractive polymer composite, said photorefractive polymer composite comprising a second-order, non-linear optical dye selected from the group consisting of 2,5-dimethyl-4-p-nitrophenylazoanisole and 2,5-dimethyl-4-p-nitrophenylazoaniline, a polymeric photoconductor consisting essentially of poly(N-vinyl-carbazole), a photosensitizer consisting essentially of a charge transfer complex consisting essentially of said poly(N-vinylcarbazole) and 2,4,7-trinitro-9-fluorenone, and a photoconductive plasticizer selected from the group consisting of N-ethylcarbazole, N-methylcarbazole, and N-phenylcarbazole, said photorefractive composite having a glass transition temperature, said photoconductive plasticizer acting to plasticize said photorefractive polymer composite beyond any plasticizing effect provided by said second-order, non-linear optical dye, said photoconductive plasticizer acting to lower said glass transition temperature such that said glass transition temperature is at or below 20° C. and said holographic device has a diffraction efficiency derived from the p-polarized readout that is greater than about 13% and approaches 100%.

38. The method of claim 37 wherein said dye has a concentration of about 50 wt %, said poly(N-vinylcarbazole) has a concentration of about 33 wt %, said photoconductive plasticizer has a concentration of about 16 wt %, and said photosensitizer has a concentration of about 1 wt %.

39. A method of forming a photorefractive polymer composite comprising combining a second-order, non-linear optical dye, a polymeric photoconductor, a photosensitizer, and a photoconductive plasticizer having a molecular weight of less than 1,000 g/mole, said photorefractive composite having a glass transition temperature, said photoconductive plasticizer acting to plasticize said photorefractive polymer composite beyond any plasticizing effect provided by said second-order, non-linear optical dye, said photoconductive plasticizer acting to lower said glass transition temperature such that said glass transition temperature is at or below about 20° C. and said photorefractive polymer composite has a diffraction efficiency derived from the p-polarized readout that is greater than about 13% and approaches 100%.

40. The method of claim 39 wherein said second-order, non-linear optical dye comprises a compound having the general formula

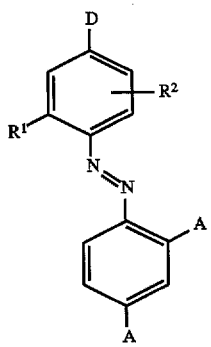

where A is —H, —NO$_2$, —CN, —Cl, —C(CN)=C(CN)$_2$, —SO$_3$R, or —COOCH$_3$, with the proviso that at least one A is not —H; D is —OR$^3$ or —NR$^3{}_2$; R, R$^1$ and R$^2$ are independently C$_{1-6}$ alkyl, or C$_{1-6}$ alkoxy; and R$^3$ is C$_{1-6}$ alkyl.

41. The method of claim 40 wherein said second-order, non-linear optical dye is selected from the group consisting of 2,5-dimethyl-4-p-nitrophenylazoanisole or 2,5-dimethyl-4-p-nitrophenylazoaniline.

42. The method of claim 39 wherein said polymeric photoconductor has a polymeric backbone selected from the group consisting of vinyl, acrylate, and methacrylate, said backbone containing pendant groups selected from the group consisting of triphenyl amine and carbazoles.

43. The method of claim 39 wherein said polymeric photoconductor is selected from the group consisting of poly(N-vinylcarbazole), poly(3-alkylthiophene)s, and polyphenylenevinylene.

44. The method of claim 39 wherein said photosensitizer is either a charge transfer complex comprising said photoconductor and a strong electron acceptor or a separate photosensitizer molecule.

45. The method of claim 44 wherein said strong electron acceptor is selected from the group consisting of 2,4,7-trinitro-9-fluorenone, 2,4,7-trinitro-9-fluorenylidene malononitrile, and tetracyanoquinodimethane and wherein said separate photosensitizer molecule consists essentially of a fullerene.

46. The method of claim 45 wherein said charge transfer complex consists essentially of poly(N-vinylcarbazole):2,4,7-trinitro-9-fluorenone.

47. The method of claim 39 wherein said photoconductive plasticizer is selected from the group consisting of carbazole, N-methylcarbazole, N-ethylcarbazole, N-butylcarbazole, N-hexylcarbazole, N-phenylcarbazole, o-nitroanisole, m-nitroanisole, p-nitroanisole, and triphenylamine.

48. The method of claim 39 wherein said second-order, non-linear optical dye is present in a concentration within a range of about 30 to 60 wt %, and said photosensitizer is present within a range about 1 wt % or less.

49. A method of forming a photorefractive polymer composite comprising combining a second-order, non-linear optical dye selected from the group consisting of 2,5-dimethyl-4-p-nitrophenylazoanisole and 2,5-dimethyl-4-p-nitrophenylazoaniline, a polymeric photoconductor consisting essentially of poly(N-vinylcarbazole), a photosensitizer consisting essentially of a charge transfer complex consisting essentially of said poly(N-vinylcarbazole) and 2,4,7-trinitro-9-fluorenone, and a plasticizer selected from the group consisting of N-ethylcarbazole, N-methylcarbazole, and N-phenylcarbazole, said photorefractive composite having a glass transition temperature, said plasticizer acting to plasticize said photorefractive polymer composite beyond any plasticizing effect provided by said second-order, non-linear optical dye said plasticizer acting to lower said glass transition temperature to room temperature such that said glass transition temperature is at or below about room temperature and said photorefractive polymer composite has a diffraction efficiency that is greater than about 13% and approaches 100%.

50. The method of claim 49 wherein said second-order, non-linear optical dye has a concentration of about 50 wt %, said poly(N-vinylcarbazole) has a concentration of about 33 wt %, said plasticizer has a concentration of about 16 wt %, and said photosensitizer has a concentration of about 1 wt %.

* * * * *

UNITED STATES PATENT AND TRADEMARK OFFICE
CERTIFICATE OF CORRECTION

PATENT NO. : 5,744,267
DATED : April 28, 1998
INVENTOR(S) : Klaus Meerholz, et al.

It is certified that error appears in the above-identified patent and that said Letters Patent is hereby corrected as shown below:

Column 1, Line 49 "$Bi_{12}TeO_2O$" should read --$Bi_{12}TeO_{20}$--.

Column 5, Line 30 "14', 14'" should read --14', 16'--.

Column 7, Line 10 "N-hexylcarbazole" should read --N-hexylcarbazole,--.

Column 13, Line 17 "N-hexylcarbazole" should read --N-hexylcarbazole,--.

Column 14, Line 19 "-H, $Cl_{1-6}$" should read ---H, $C_{1-6}$--.

Column 14, Line 23 "of 2,5dimethyl" should read --of 2, 5-dimethyl--.

Column 14, Line 51 "N-hexylcarbazole" should read --N-hexylcarbazole,--.

Column 16, Line 33 "N-hexylcarbazole" should read --N-hexylcarbazole,--.

Signed and Sealed this

Fourth Day of January, 2000

Attest:

*Attesting Officer*

*Acting Commissioner of Patents and Trademarks*